US006861653B2

(12) United States Patent
Liu et al.

(10) Patent No.: US 6,861,653 B2
(45) Date of Patent: *Mar. 1, 2005

(54) EQUIPMENT AND METHOD FOR INLINE INFRARED AND ULTRAVIOLET IRRADIATION OF RECORDING MEDIA

(75) Inventors: Jianwei Liu, Fremont, CA (US); Michael J. Stirniman, Fremont, CA (US); John S. Bujak, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/411,114

(22) Filed: Apr. 11, 2003

(65) Prior Publication Data

US 2004/0200981 A1 Oct. 14, 2004

(51) Int. Cl.[7] .............................................. B29D 11/00
(52) U.S. Cl. .............................. 250/455.11; 250/492.1
(58) Field of Search ....................... 250/455.11, 492.1; 428/695

(56) References Cited

U.S. PATENT DOCUMENTS

| 2,876,187 | A | 3/1959 | Wolinski |
| 4,276,479 | A | 6/1981 | Mibu et al. |
| 5,030,478 | A | 7/1991 | Lin et al. |
| 5,273,830 | A | 12/1993 | Yaguchi et al. |
| 6,043,194 | A | 3/2000 | Saito et al. |
| 6,096,385 | A | 8/2000 | Yong et al. |
| 6,099,762 | A | 8/2000 | Lewis |
| 6,204,504 | B1 | 3/2001 | Lewis |
| 2002/0034594 | A1 | 3/2002 | Shiveley |

FOREIGN PATENT DOCUMENTS

JP          05-028478 A  *  2/1993 ................. 428/695

OTHER PUBLICATIONS

Roper, Gerald C., "vapor pressure." Grolier Multimedia Encyclopedia. Scholastic Library Publishing, 2004 <http://gme.grolier.com> (Jun. 7, 2004).*

"The Mechanism of Ultraviolet Bonding of Perfluoropolyether Lubricants", IEEE Transactions on Magnetic, vol. 29, No. 1 Jan. 1993.

* cited by examiner

Primary Examiner—Jack I. Berman
(74) Attorney, Agent, or Firm—Morrison & Foerster LLP

(57) ABSTRACT

An equipment and method for inline infrared (IR) ultraviolet (UV) irradiation of recording media is disclosed. The components of the equipment include a saddle for holding a recording medium such as a disc, a conveyor that travels the saddle through a tunnel in which one or more IR and UV lamps are positioned to direct IR and UV light on the recording media traveling through the tunnel. The efficacy of the bonding of the lubricant to the recording medium by UV light is substantially enhanced by exposing the recording medium to IR light prior to exposure to UV light.

19 Claims, 10 Drawing Sheets

EQUIPMENT AND METHOD FOR INLINE INFRARED AND ULTRAVIOLET IRRADIATION OF RECORDING MEDIA

RELATED APPLICATIONS

This application is related to U.S. Ser. No. 10/224,418, entitled "APPARATUS FOR INLINE CONTINUOUS AND UNIFORM ULTRAVIOLET IRRADIATION OF RECORDING MEDIA," the entire disclosure of which is hereby incorporated herein by reference.

FIELD OF THE INVENTION

The present invention relates to an equipment and method for inline infrared and ultraviolet (UV) irradiation of recording media that permits good bonding of a bonded lubricant on the recording media and, thereby, creating a media surface having a high water contact angle.

BACKGROUND

Magnetic discs with magnetizable media are used for data storage in most all computer systems. Current magnetic hard disc drives operate with the read-write heads only a few nanometers above the disc surface and at rather high speeds, typically a few meters per second. Because the read-write heads can contact the disc surface during operation, a thin layer of lubricant is coated on the disc surface to reduce wear and friction.

A conventional longitudinal recording disc medium is depicted in FIG. 1 and typically comprises a non-magnetic substrate 10 having sequentially deposited on each side thereof an underlayer 11, 11', such as chromium (Cr) or Cr-alloy, a magnetic layer 12, 12', typically comprising a cobalt (Co)-base alloy, and a protective overcoat 13, 13', typically containing carbon. Conventional practices also comprise bonding a lubricant topcoat 14, 14' to the protective overcoat. Underlayer 11, 11', magnetic layer 12, 12', and protective overcoat 13, 13', are typically deposited by sputtering techniques. The Co-base alloy magnetic layer deposited by conventional techniques normally comprises polycrystallites epitaxially grown on the polycrystal Cr or Cr-alloy underlayer. A conventional perpendicular recording disc medium is similar to the longitudinal recording medium depicted in FIG. 1, but does not comprise a Cr-containing underlayer.

Generally, the lubricant is applied to the disc surface by dipping the disc in a bath containing the lubricant. The bath typically contains the lubricant and a coating solvent to improve the coating characteristics of the lubricant that is usually a viscous oil. The discs are removed from the bath, and the solvent is allowed to evaporate, leaving a thin layer of lubricant on the disc surface.

The lubricant film on hard discs provides protection to the underlying magnetic alloy by preventing wear of the carbon overcoat. In addition, it works in combination with the overcoat to provide protection against corrosion of the underlying magnetic alloy. To improve media reliability as well as tribological performance, irradiation of lubricated media by ultraviolet (UV) light has been introduced to chemically modify the lubricant film. Since the efficiency of UV curing is directly related to throughput of the process, it is important to develop methods to reduce the UV dosage and still produce a high performance lubricant film.

SUMMARY OF THE INVENTION

The invention involves a process to raise the thin film storage media temperature well above room temperature prior to UV irradiation, through the use of infrared (IR) heating. The IR/UV process is more efficient than the UV process alone.

One embodiment of this invention relates to an inline IR and UV processing equipment comprising a saddle for holding a recording medium, a conveyor, a tunnel and IR and UV lamps, wherein the saddle travels on the conveyer through the tunnel and the IR and UV lamps are positioned to direct IR and UV light on the recording medium in the tunnel. The equipment could further comprise a cassette for holding the recording medium and a station for holding the cassette. The saddle could enter one side of the tunnel and exits the other side of the tunnel. The IR and UV lamps produce a substantially uniform intensity of IR and UV light on the recording medium traveling through the tunnel. Preferentially, the IR and UV lamps (the UV lamps could be mercury discharge lamps) are arranged in a row on either side of the conveyor. The conveyor travels at a speed such that a new recording medium enters the tunnel at a time interval in the range of about 6 to 60 seconds. Preferably, there is no lifting and lowering of the saddle. In one variation, the equipment further comprises an enclosure in the tunnel, wherein the enclosure contains a lubricant vapor.

Another embodiment of this invention relates to a method for irradiating a lubricant on a recording medium, comprising loading the recording medium on a saddle, traveling the saddle through a tunnel and shining IR and UV light on the recording medium in the tunnel. The method could further comprise curing the lubricant on the recording medium.

Yet another embodiment of this invention relates to an equipment for inline IR and UV exposure of a lubricant on a recording medium, comprising a tunnel and means for producing a substantially uniform intensity of IR and UV light on the recording medium traveling through the tunnel. The phrase "means for producing a substantially uniform intensity of IR and UV light on the recording medium traveling through the tunnel" refers to an equipment having a tunnel in which there are IR and UV lamps that are directed on the recording medium traveling through the tunnel such that multiple lamps average the IR and UV intensity due any potential lamp differences over a single recording medium.

BRIEF DESCRIPTION OF THE DRAWINGS

The present invention will be better understood by reference to the Detailed Description of the Invention when taken together with the attached drawings, wherein.

cyclotriphosphazene ("X1P" made by Dow Chemical Company) in a decafluoropentane solvent ("Vertrel®-XF" made by DuPont®).

Figure 8:
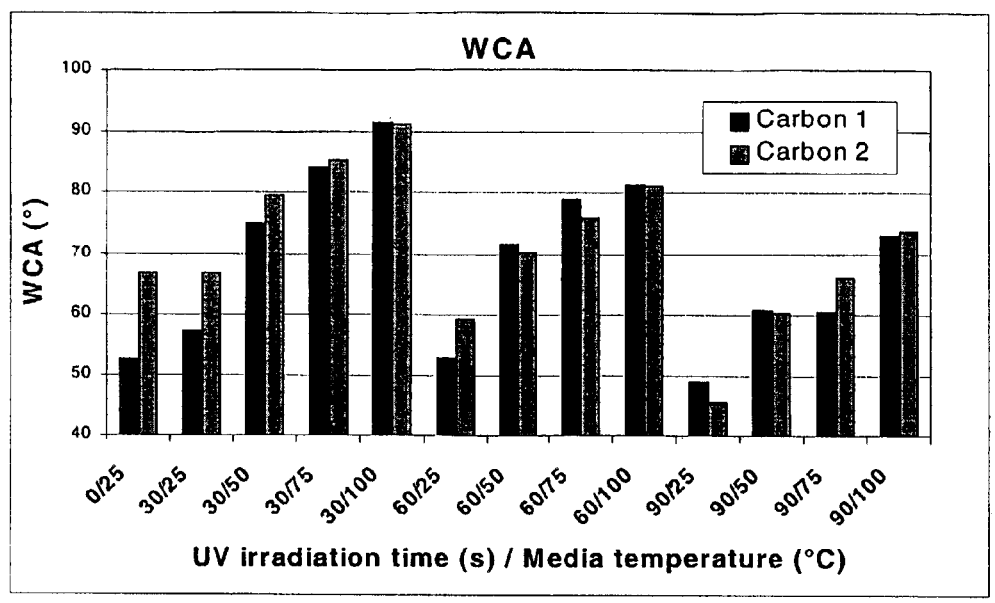

FIG. 8 shows the water contact angle of lubricant films as a function of UV irradiation time and media temperature.

Figure 9:
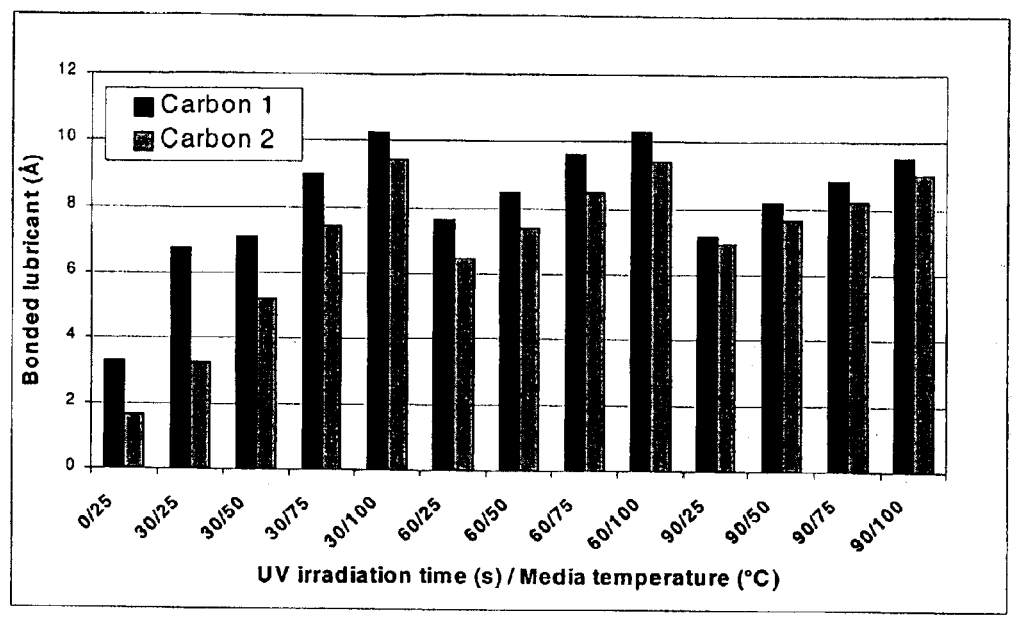

FIG. 9 shows the bonded lubricant of a 12 Å lubricant film as a function of UV irradiation time and media temperature.

Figure 10:
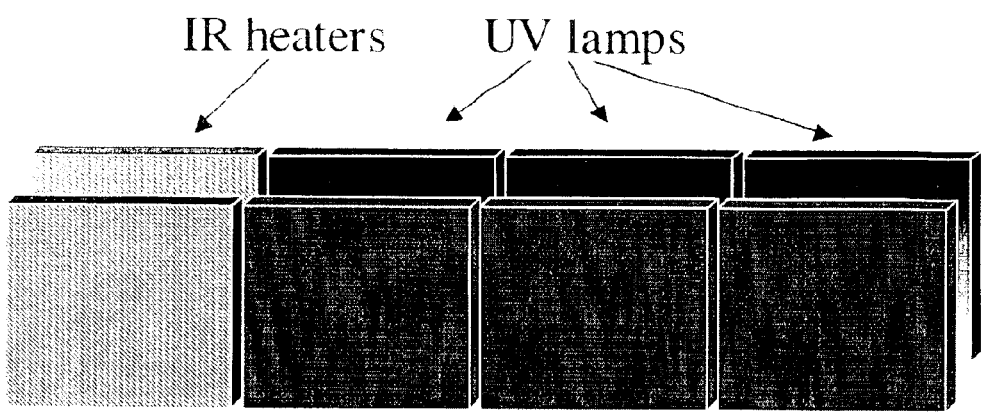

FIG. 10 shows a schematic drawing of a pair of IR lamps to raise media temperature prior to the UV exposure of the media.

DETAILED DESCRIPTION OF THE INVENTION

The invention is directed to a method of coating a substrate, particularly recording media (recording discs), with a lubricant, which is also referred in the specification to as a "lube." Lubricants typically contain molecular weight components that range from several hundred Daltons to several thousand Daltons.

In this invention, substantially uniform intensity of IR or UV light on the recording medium means that the variation in the IR or UV intensity from a point ($I_1$) to another point ($I_2$) on the surface of the recording medium, wherein $I_1 > I_2$, obeys the following relationship:

$$0.8 < I_2/I_1 < 1.2$$

Figure 1:
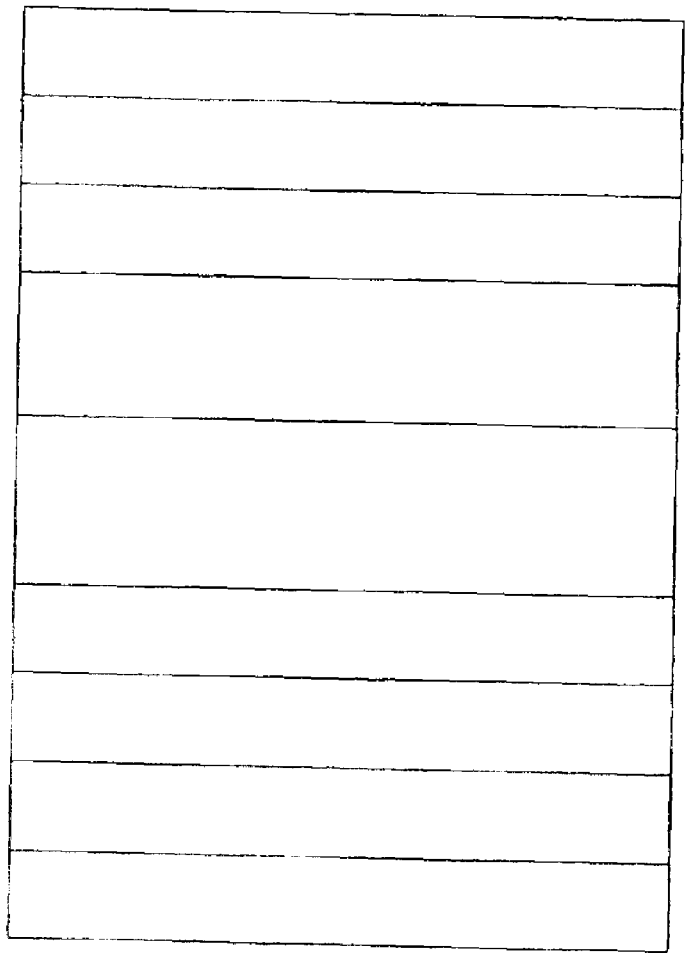
FIG. 1 shows a magnetic recording medium.
Figure 2:
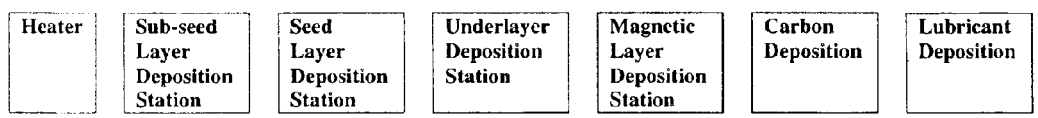
FIG. 2 shown an inline process for manufacturing magnetic recording media.

An inline process for manufacturing magnetic recording media is schematically illustrated in FIG. 2. The disc substrates travel sequentially from the heater to a sub-seed layer deposition station and a sub-seed layer is formed on the disc substrates. Then, the disc substrates travel to a seed layer station for deposition of the seed layer, typically NiAl. Subsequent to the deposition of the sub-seed layer and the seed layer, the disc substrates are passed through the underlayer deposition station wherein the underlayer is deposited. The discs are then passed to the magnetic layer deposition station and then to the protective carbon overcoat deposition station. Finally, the discs are passed through a lubricant layer deposition station.

Irradiation of a recording medium can be achieved through the use of a so-called "static" irradiation apparatus, as described for example in U.S. Pat. No. 6,204,504. In such a static irradiation process, discs were placed on a saddle and lifted individually into a space between two ultraviolet lamps in a dedicated process chamber. Varying the time that the disc is in the chamber controlled the irradiation duration. At the end of the process, the irradiated disc was lowered and unloaded from the saddle, a fresh disc was loaded, and the cycle was repeated.

Applicants found that the "static" irradiation apparatus suffers from the following defects.

The irradiation time is not constant over the surface of the medium, i.e. the top of the disc, which enters the process chamber first and exits last, receives proportionally more radiation than the bottom of the disc. This top-to-bottom discrepancy increases as the process time and/or the lift speed decrease. Because the mercury discharge lamps commonly used for ultraviolet processing require a stabilization time much longer than a typical process time, using the lamp on time to control the process cannot mitigate this problem. A shutter mechanism could be used, but would increase the complexity, processing time and cost of the apparatus.

The yield is low and processing cost is high using the "static" irradiation apparatus. The number of recording media processed per "static" irradiation apparatus is relatively low compared to rest of the manufacturing process shown in FIG. 2. Recording media manufacturing is a relatively high-volume operation, and to achieve a throughput compatible with the rest of the manufacturing process would require multiple individual ultraviolet process chambers, with a corresponding increase in equipment and processing cost. In addition to the increased equipment cost, the use of multiple process chambers would also result in process non-uniformity due to lamp variability. For example, mercury discharge lamps are known to slowly lose intensity over their lifetime, and the use of process chambers with mixed old and new lamps at a fixed irradiation time would result in disc-to-disc variations in tribological properties.

Figure 3:
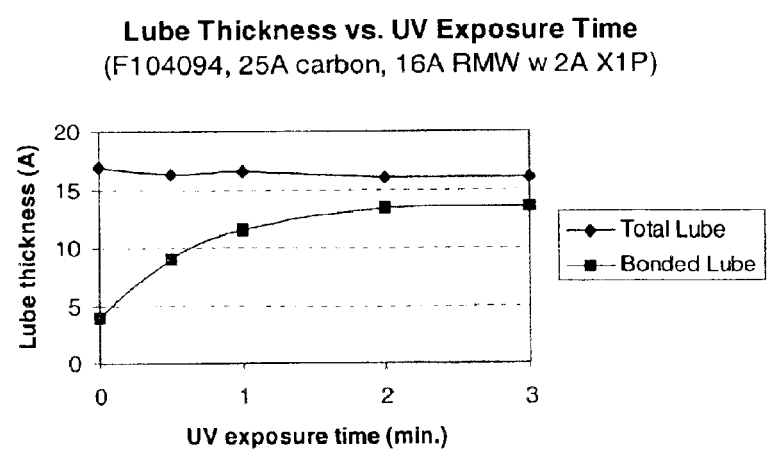
FIG. 3 shows lube thickness with UV exposure time.
Figure 4:
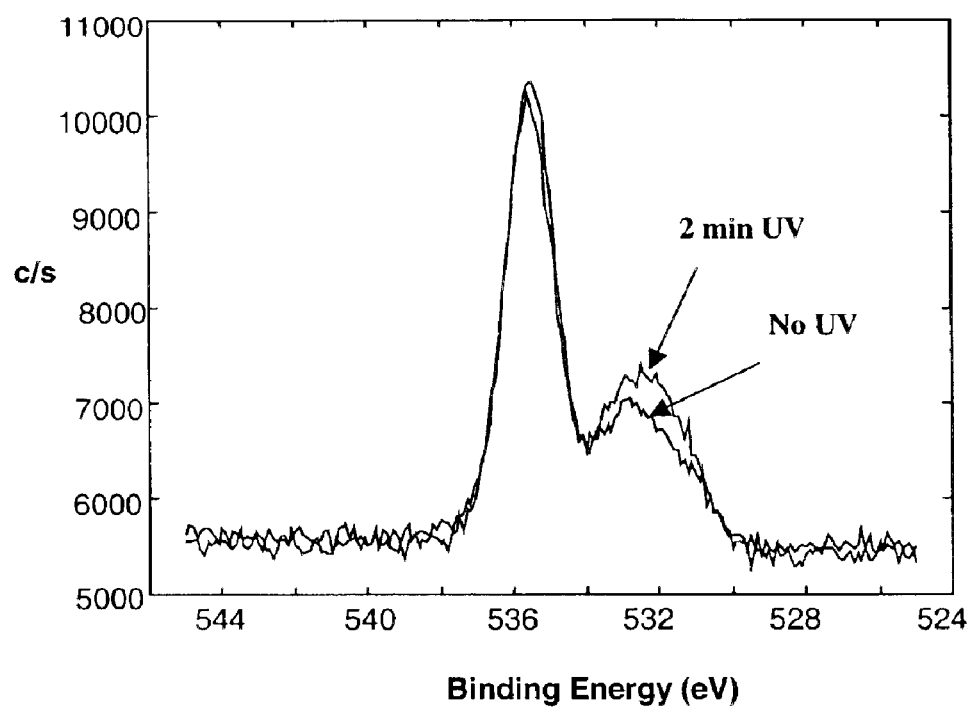
FIG. 4 shows ESCA data of a lube without UV exposure and a lube having a 2-minute UV exposure, but without IR exposure.

The problems associated with the "static" irradiation apparatus could be better understood with reference to FIG. 3 that depicts the thickness of total and bonded lube thickness with UV exposure. Magnetic recording media discs were coated with a lubricant and exposed to UV light such that the UV light exposure was uniform throughout the surface of the disc. The total lubricant thickness was maintained at about 16 Å and the UV exposure time was varied from 0 to 3 minutes. After exposure, the discs were degreased in the vapor of a lubricant solvent, e.g., Vertrel® XF, to remove non-bonded lube. Subsequently, the thickness of the bonded lube was measured. FIG. 4 shows that even though the thickness of the total lube was approximately 16 Å, the thickness of the bonded lube increases with UV exposure time and starts tapering off after 1 minute of UV exposure.

In the manufacturing process shown in FIG. 2, the time spent per disc at the lubrication station is typically from about 30 seconds to a minute depending on the lube type and product type. Assume that the lubrication station is a "static" irradiation apparatus in which the UV lamps are on all the time while the manufacturing process is on. Then, out of the 30-second time spent at the lubrication station, the time for entry and exit of the disc into the "static" irradiation apparatus would typically be about 10 seconds. This means that the leading, i.e., top, edge of the disc would be exposed to UV for 30 seconds while the trailing, i.e., bottom, edge would be exposed to UV for only 20 seconds. FIG. 3 shows that bonded lube thickness for UV exposures of 20 and 30 seconds are about 7 Å and 9 Å, respectively.

Typically, it takes several seconds to lift a disc into a static chamber. However, an advantage of this invention that is totally absent in the static chamber is throughput. That is, by having a long tunnel type chamber that can hold several discs, typically six, applicants can index the discs through the chamber every 10 seconds while allowing a 60 seconds cure time. This means that even once the tunnel is loaded, applicants get a though put of one disc every 10 seconds with a 60 second exposure time.

Inventors also found that the possible mechanism why UV exposure results in an increase in bonded lube thickness. FIG. 4 shows the ESCA plots of lubes with no UV exposure and 2 minute UV exposure. ESCA data reveal that the amount of C—O and C=O bonds on carbon surface increases after UV exposure, which suggests that the ozone generated during the UV irradiation process reacts with the carbon surface to form functional groups such as COOH and C—OH. The strong dipole-dipole interaction between carboxyl and hydroxyl end groups bonded lube to the carbon surface is thus formed.

The lubricants typically applied to recording media include polyfluoroether compositions that may be terminally functionalized with polar groups, such as hydroxyl, carboxy, or amino. The polar groups provide a means of better attaching or sticking the lubricant onto the surface of the recording media. These fluorinated oils are commercially available under such trade names as Fomblin Z®, Fomblin Z-Dol®, Fomblin Ztetraol®, Fomblin Am2001®, Fomblin Z-DISOC® (Montedison); Demnum® (Daikin) and Krytox® (Dupont). The chemical structures of some of the Fomblin lubricants are shown below.

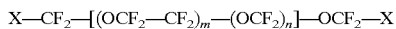

Fomblin Z: Non-reactive end groups

Fomblin Zdol: Reactive rnd groups

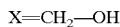

Fomblin AM2001: Reactive end groups

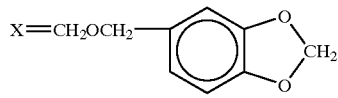

Fomblin Ztetraol: Reactive end groups

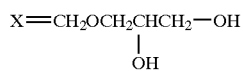

The thickness of the lubricant coating should be at least 0.5 nm, preferably at least 1 nm, and more preferably at least 1.2 nm and will generally be below 3 nm, preferably in the range from 1 nm to 3 nm. Molecular weight components of particular interest that provide higher film thickness range from 1 kD to 10 kD, preferably from 2 kD to 8 kD.

One way of describing a distribution of molecular components of a polymer, i.e., polydispersity, is to compare the weight average molecular weight defined as $$M_w = \Sigma m_i M_i / \Sigma m_i$$

where $m_i$ is the total mass of molecular component in the polymer having a molecular weight $M_i$, with the number average molecular weight defined as $$M_n = \Sigma N_i M_i / \Sigma N_i$$

where $N_i$ is the total number of each molecular component in the polymer having a molecular weight $M_i$. The weight average molecular weight ($M_w$) of a polymer will always be greater than the number average molecular weight ($M_n$), because the later counts the contribution of molecules in each class $M_i$ and the former weighs their contribution in terms of their mass. Thus, those molecular components having a high molecular weight contribute more to the average when mass rather than number is used as the weighing factor.

For all polydisperse polymers the ratio $M_w/M_n$ is always greater than one, and the amount by which this ratio deviates from one is a measure of the polydispersity of the polymer. The larger the $M_w/M_n$ ratio the greater the breadth of the molecular weight distribution of the polymer.

The molecular weight distribution of the vapor phase can be sampled by condensation of the vapor onto a suitable surface, followed by analysis of the condensate in a calibrated size exclusion chromatography system.

It is desirable that the fresh lubricant has a relatively narrow molecular weight distribution of molecular components. In practice, the narrower the distribution the easier it will be to maintain a steady-state concentration of one or more components in the vapor. For example, if the highest and lowest molecular weight components in the polymer have very similar molecular weights, their vapor pressures will also be very similar. On the other hand, if the molecular weights (vapor pressures) are dramatically different heating of the lubricant will require much greater temperature and process control for a steady state concentration to be maintained. The lubricant used in the invention should have a $M_w/M_n$ ratio between 1 and 1.6, preferably between 1 and 1.3, more preferably between 1 and 1.2.

The invention can be practiced with any commercial lubricant with a relatively large or small polydispersity, or with a lubricant that has been pre-fractionated to obtain a lubricant with a relatively small polydispersity. The preferred embodiment of the invention does not involve pre-fractionation of the lubricant. However, pre-fractionated lubricants may be used to provide relatively narrow molecular weight lubricant. If a pre-fractionated lubricant is used in the invention, distillation, chromatography, extraction, or other techniques that allow separation can obtain the pre-fractionated lubricant by molecular weight.

EXAMPLES

One embodiment of the invention includes the use of an in-line IR and UV irradiation method, in which the discs that are previously coated with a lube are loaded onto a saddle and travel on a conveyor through a tunnel, passing in front of multiple IR and UV lamps. The exposure time is controlled by the speed of the conveyor. The use of multiple lamps and a conveyor system allows higher throughput in a single process chamber, reducing the number of process stations required. Multiple lamps also average any potential lamp differences over a single disc and reduce the process variation, and the top-to-bottom exposure difference in the static process is eliminated by the separate entrance and exit slits.

Figure 5:
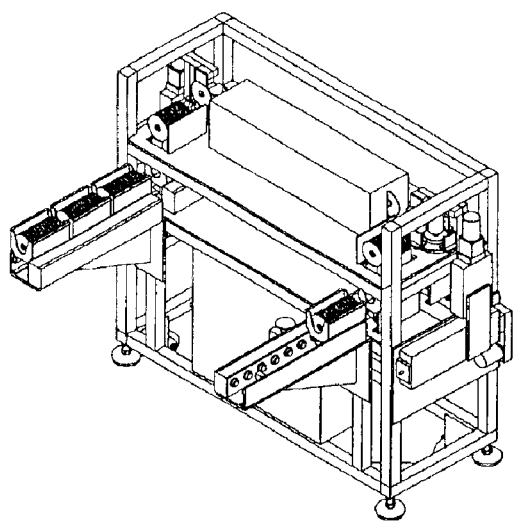
FIG. 5 shows in-line IR and UV processing tool including cassette loading and unloading stations.
Figure 6:
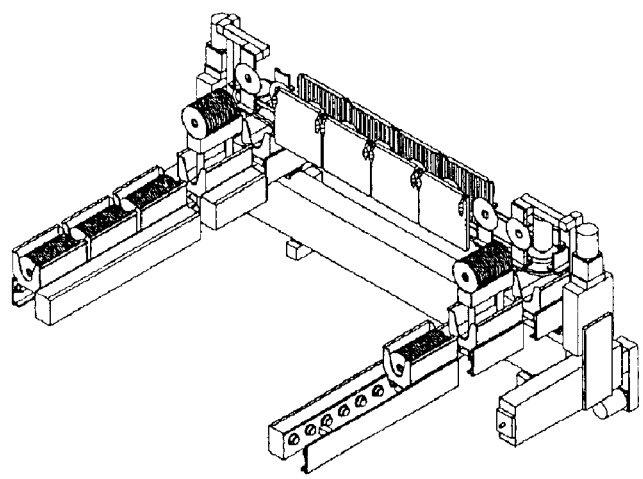
FIG. 6 shows the process station section of the in-line IR and UV processing tool with the protective cover removed to show the media conveyor system and multiple IR and UV lamps.

FIGS. 5 and 6 illustrate the production machine developed for the in-line UV processing of media. FIGS. 5 and 6 show cassette input (51 and 61), disk load robot (52 and 62), IR and UV chamber (53) and IR and UV lamps (63), disk unload robot (54 and 64), cassette output (55 and 65) and disk saddle conveyor (66).

As FIG. 6 shows, four grid-type mercury discharge lamps are arranged in a row on either side of the disc conveyor, as opposed to a single lamp on either side in a static processing arrangement. This lamp configuration increases the throughput of a single machine by a factor of four. Because the disc enters one side of the tunnel and exits the other, the process variation due to the lifting and lowering of the saddle in the static process is eliminated. Finally, process variance due to any potential lamp-to-lamp differences will also be reduced by a factor of four with this configuration.

The following details on the in-line production machine and method further describe this invention. First, the operator loads a cassette full of lubed (but not cured) discs onto an input conveyor. The operator starts the operation and the cassette automatically enters the production machine. One disc at a time is taken from the cassette and introduced into the tunnel, wherein the disc travels and is placed into another cassette. When the cassettes at either the entrance or exit of the tunnel are empty or full, respectively, the production machine signals the operator to load or unload the cassettes. The typical speeds of the conveyor line are such that with a 60 second IR and UV exposure time, the through put is 340 discs per hour, and for a 40 second exposure time, the through put is 480 discs per hour.

In one variation of the in-line lube equipment of FIG. 6, the disc could be coated with a lube and simultaneously irradiated with IR and UV in the in-line equipment. Such a variation would require a IR and UV transparent chamber within the tunnel of the in-line IR and UV processing equipment of FIG. 5. The IR and UV transparent chamber would contain the vaporized lube. The discs would travel through the IR and UV transparent chamber. The vaporized lube would be deposited on the discs and be irradiated with IR and UV thus providing simultaneous lube deposition and IR and UV irradiation in the in-line equipment.

UV photochemical reactions in lubricant films promote strong bonding interactions between the lubricant molecules and the carbon overcoat. When the energy of the incident UV light is greater than the work function of the carbon overcoat (typically ~5 eV), photoelectrons are emitted from the carbon overcoat (see e.g., Vurens, G. H. et al. IEEE Transactions on Magnetics, 29, 1, 1993, p. 282), and series chemical reactions are triggered in perfluoropolyether (PFPE) lubricant molecules.

Typical UV process lamps, low or medium pressure mercury discharge, generate UV at two useful wavelengths, 185 nm and 254 nm. The 254 nm UV is the more dominant component, about 85% of the total UV intensity. However, this longer wavelength UV has only a weak effect on media lubricants at room temperature, since its photon energy is only 4.9 eV, not energetic enough to produce large fluxes of photoelectrons.

Figure 7:
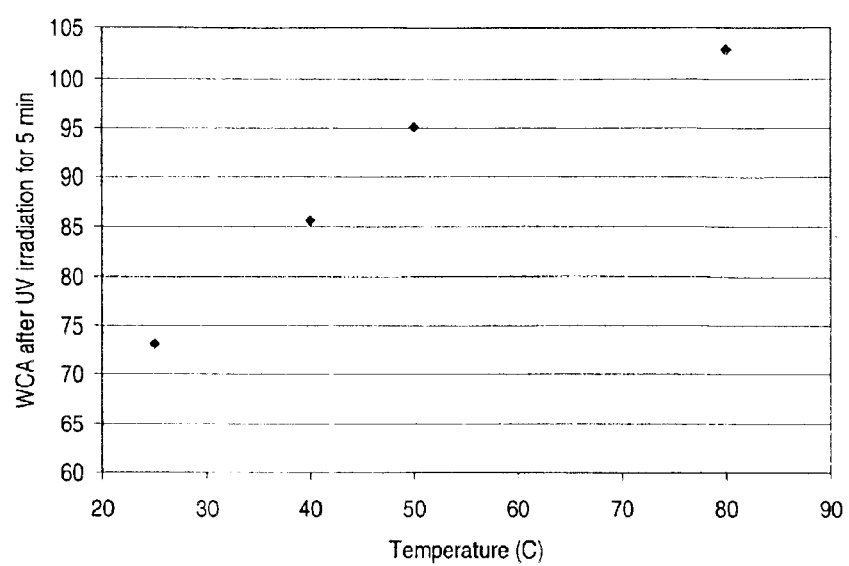
FIG. 7 shows water contact angle of lubricant films of a lubricant solution coated media after irradiation by an UV laser beam of a wavelength of 266 nm for 5 min at various temperatures. The lubricant solution contains about 1 weight percent Fomblin Z® and about 0.1 weight percent Bis(4-fluorophenoxy)-tetrakis(3-trifluoromethyl phenoxy)

To improve the UV process efficiency, the effectiveness of the longer wavelength component of the UV light must be enhanced. Applicants observed that elevating media temperature improves the long wavelength UV efficiency. For example, irradiation by a 266 nm laser beam has no effect on a PFPE lubricant film at 25° C. However, at elevated temperature exposure to the same laser beam can increase the water contact angle (WCA) of the lubricant film significantly (FIG. 7). A second example shows the same effect using a standard mercury discharge UV lamp to irradiate media placed on a heated stage. Both the WCA (FIG. 8) and the bonded lubricant (FIG. 9) show a strong temperature dependence at a fixed UV irradiation time. The bonded lubricant is defined as the lubricant remaining on the media after they are washed in a fluorinated solvent. The composition of the lubricant solution used for the samples shown in FIGS. 8 and 9 is 1% Fomblin Z and 0.1% X-1p in Vertrel XF. In FIGS. 8 and 9, Carbon 1 and Carbon 2 refer to two types of Ion Beam Carbon overcoat. The difference between them lies on the chemical composition of the top-layer of the carbon overcoat. Carbon 1 has higher nitrogen content than Carbon 2. The nitrogen to carbon ratio of Carbon 1 and Carbon 2 are in the range from about 0.01 to about 0.17, with intermediate values from about 0.1 to about 0.16 in increments of about 0.1. The media substrate of the samples of FIGS. 8 and 9 were made of aluminum. The fluorinated solvent used for washing the media was Vertrel® XF.

Applicants found that in a production process using UV lamps only without any IR lamps, the rise in media temperature by the heating from the UV lamps is rather limited. On the other hand, IR heaters could raise media temperature rapidly from room temperature to a given process temperature, say 80° C., in less than 10 sec. Inserting IR lamps immediately before the UV process lamps (FIG. 10) effectively enhanced the UV process efficiency.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the priority documents, patents and publications referred in this application are hereby incorporated herein by reference.

What is claimed is:

1. An inline processing equipment for inline UV exposure of a lubricant on a recording medium comprising a saddle for holding a recording medium, a conveyor, a tunnel, one or more IR lamps and one or more UV lamps, wherein the saddle travels on the conveyer through the tunnel, the IR and UV lamps are positioned to direct IR and UV light on the lubricant of the recording medium in the tunnel, further wherein the lubricant is deposited on the recording medium in the tunnel.

2. The equipment of claim 1, wherein the recording medium is first exposed to IR light before being exposed to UV light.

3. The equipment of claim 1, wherein the IR light raises a temperature of the surface of the recording medium from about a room temperature to about 35° C. to about 100° C.

4. The equipment of claim 1, wherein the IR light raises a temperature of the surface of the recording medium from about a room temperature to about 40° C. to about 60° C.

5. The equipment of claim 1, wherein said IR and UV lamps produce a substantially uniform intensity of IR and UV light on the recording medium traveling through the tunnel.

6. The equipment of claim 1, wherein said UV lamps comprise lamps generating UV at wavelengths of about 185 nm and about 254 nm.

7. The equipment of claim 1, wherein the conveyor travels at a speed such that a new recording medium enters the tunnel at a time interval in the range of about 6 to 60 seconds.

8. The equipment of claim 1, wherein there is no lifting and lowering of the saddle.

9. The equipment of claim 1, further comprising an enclosure in the tunnel, wherein the enclosure contains a lubricant vapor.

10. The equipment of claim 1, wherein the recording medium enters one side of the tunnel and exits the other side of the tunnel.

11. A method for irradiating a lubricant on a recording medium, comprising loading the recording medium on a saddle of an equipment for inline UV exposure, traveling the saddle through a tunnel and shining IR and UV light on the lubricant of the recording medium in the tunnel, further comprising depositing the lubricant on the recording medium in the tunnel.

12. The method of claim 11, wherein the saddle travels on a conveyor.

13. The method of claim 11, wherein the recording medium enters one side of the tunnel and exits the other side of the tunnel.

14. The method of claim 11, wherein the recording medium is first exposed to IR light before being exposed to UV light.

15. The method of claim 11, wherein the conveyor travels at a speed such that a new recording medium enters the tunnel at a time interval in the range of about 6 to 60 seconds.

16. The method of claim 11, wherein there is no lifting and lowering of the saddle.

17. The method of claim 11, wherein the IR light raises a temperature of the surface of the recording medium from about a room temperature to about 35° C. to about 100° C.

18. The method of claim 11, further comprising curing the lubricant on the recording medium.

19. An inline UV processing equipment for inline IR and UV exposure of a lubricant on a recording medium, comprising a tunnel and means for producing a substantially uniform intensity of IR and UV light on the lubricant of the recording medium traveling through the tunnel, further wherein the lubricant is deposited on the recording medium in the tunnel.

* * * * *